(12) United States Patent
Morita

(10) Patent No.: US 11,108,932 B2
(45) Date of Patent: Aug. 31, 2021

(54) IMAGE TEST APPARATUS, IMAGE FORMING SYSTEM AND RECORDING MEDIUM

(71) Applicant: Konica Minolta, Inc., Tokyo (JP)

(72) Inventor: Keisuke Morita, Akishima (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/436,047

(22) Filed: Jun. 10, 2019

(65) Prior Publication Data

US 2019/0394355 A1 Dec. 26, 2019

(30) Foreign Application Priority Data

Jun. 22, 2018 (JP) .............................. JP2018-118414

(51) Int. Cl.
| | |
|---|---|
| *H04N 1/04* | (2006.01) |
| *H04N 1/387* | (2006.01) |
| *H04N 1/00* | (2006.01) |
| *H04N 1/393* | (2006.01) |

(52) U.S. Cl.
CPC ....... *H04N 1/3873* (2013.01); *H04N 1/00005* (2013.01); *H04N 1/0009* (2013.01); *H04N 1/00018* (2013.01); *H04N 1/00029* (2013.01); *H04N 1/3878* (2013.01); *H04N 1/393* (2013.01); *H04N 1/00411* (2013.01); *H04N 2201/0091* (2013.01); *H04N 2201/0094* (2013.01)

(58) Field of Classification Search
CPC ............. H04N 1/3873; H04N 1/00005; H04N 1/00018; H04N 1/00029; H04N 1/0009; H04N 1/3878; H04N 1/393; H04N 1/00411; H04N 2201/0091; H04N 2201/0094
USPC ....................................... 358/3.26, 449, 488
See application file for complete search history.

(56) References Cited

U.S. PATENT DOCUMENTS

| | | | |
|---|---|---|---|
| 9,536,297 B2 * | 1/2017 | Araki | ...................... G06T 7/001 |
| 2015/0078627 A1 * | 3/2015 | Fukase | .................... G06T 7/001 382/112 |
| 2016/0335760 A9 * | 11/2016 | Araki | .................... G06T 7/0008 |

FOREIGN PATENT DOCUMENTS

| | | |
|---|---|---|
| JP | 07186375 A | 7/1995 |
| JP | 2013057929 A | 3/2013 |

* cited by examiner

*Primary Examiner* — Cheukfan Lee
(74) *Attorney, Agent, or Firm* — Cantor Colburn LLP

(57) ABSTRACT

An image test apparatus includes an image reader which reads paper on which an image is formed from an image formed surface side to acquire test image data including an entire region of the paper, and a hardware processor which detects a defect in the test image data by comparing the test image data acquired by the image reader with correct image data, the hardware processor detecting a defect in the test image data in a region where the test image data overlaps with the correct image data after aligning positions of the test image data and the correct image data by aligning positions of images to each other.

11 Claims, 7 Drawing Sheets

FIG.5A
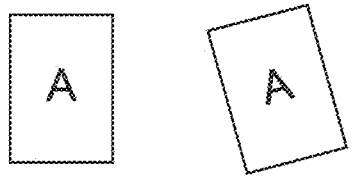
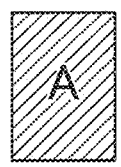
FIG.5B
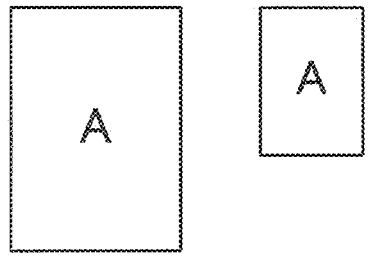
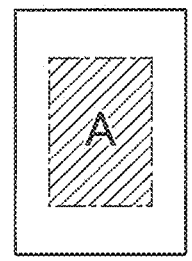
FIG.5C
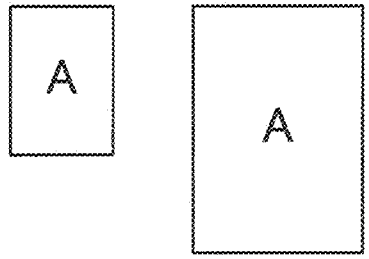
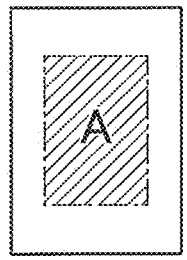
FIG.5D
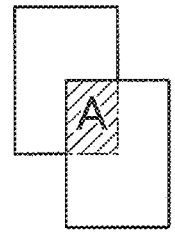

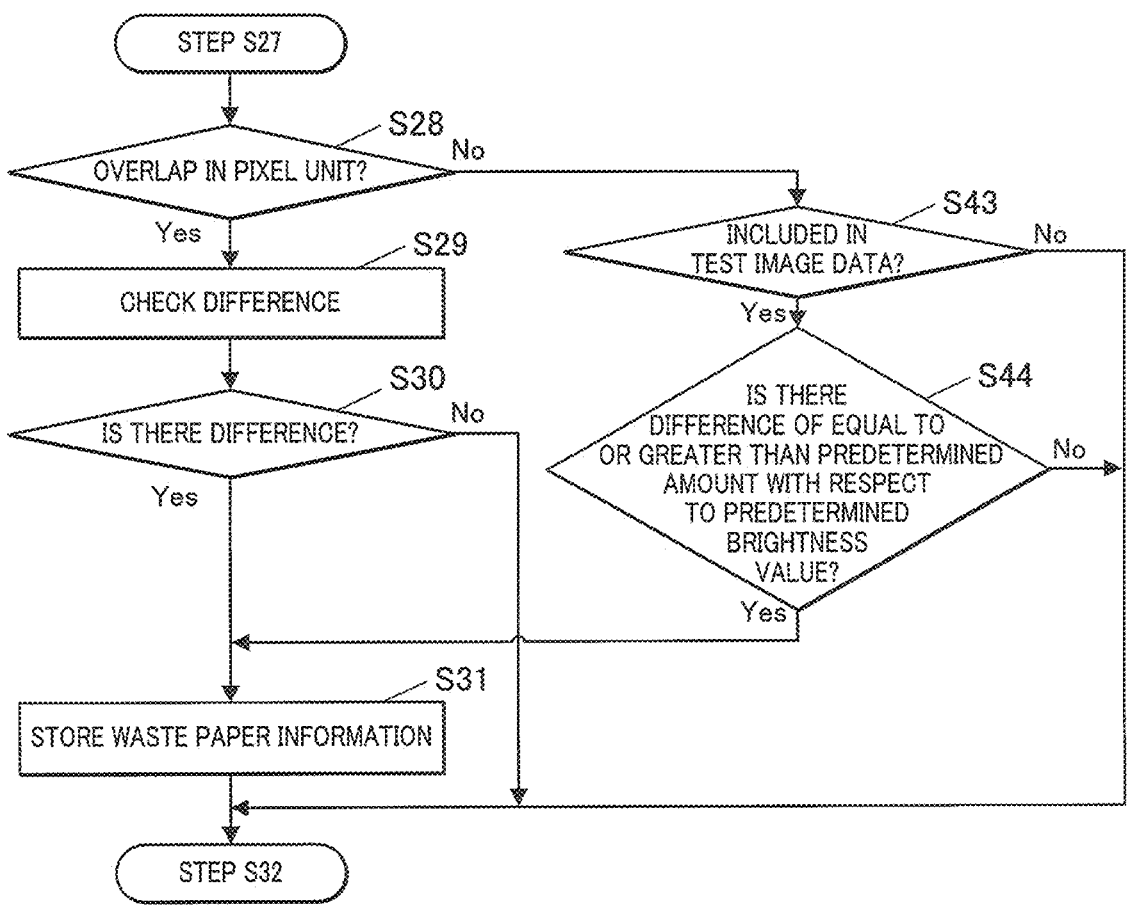

IMAGE TEST APPARATUS, IMAGE FORMING SYSTEM AND RECORDING MEDIUM

CROSS REFERENCE TO RELATED APPLICATIONS

The present invention claims priority under 35 U.S.C. § 119 to Japanese Application No. 2018-118414, filed Jun. 22, 2018, the entire content of which is incorporated herein by reference.

BACKGROUND

Technological Field

The present invention relates to an image test apparatus, an image forming system and a recording medium.

Description of the Related Art

Conventionally, after an image has been formed on paper by an image forming apparatus such as a printer and a copier, a test has been performed as to whether an image forming result is favorable or not on the basis of image data obtained by reading an image formed surface of the paper.

For example, Japanese Patent Laid-Open No. 7-186375 proposes a technique of comparing a reference image created by importing picture information of a normal printed matter with a test image created by reading picture information of a matter to be tested to obtain a difference value, and detecting a defect by comparing this difference value with an acceptable value (threshold).

Further, Japanese Patent Laid-Open No. 2013-57929 proposes a technique of correcting a position gap of an image in a test of the image in which a read image obtained by reading an output result of image forming output is compared with a master image.

However, in a test disclosed in Japanese Patent Laid-Open No. 7-186375 and Japanese Patent Laid-Open No. 2013-57929, because a size of paper to be tested is not taken into account, in the case where the size of the paper to be tested is not the same as a size of paper on which a reference image (master image) is formed, there has been a possibility that a difference in the size may be detected as an abnormality. Here, because the sizes of the paper become different from each other due to a cutting error or shrinkage of paper by fixing as well as a difference in setting of a paper size, in a test in which the size of paper is not taken into account, it is concerned that erroneous determination frequently occurs due to a difference in the paper size. Further, frequent occurrence of erroneous determination leads to decrease in productivity.

SUMMARY

Problems to be solved by the present invention are to avoid erroneous determination in a test due to variation in a paper size, and to prevent decrease in productivity.

To achieve at least one of the abovementioned objects, according to a first aspect of the present invention, an image test apparatus reflecting one aspect of the present invention comprises an image reader which reads paper on which an image is formed from an image formed surface side to acquire test image data including an entire region of the paper, and a hardware processor which detects a defect in the test image data by comparing the test image data acquired by the image reader with correct image data, in which, the hardware processor detects a defect in the test image data in a region where the test image data overlaps with the correct image data after aligning positions of the test image data and the correct image data by aligning positions of images to each other.

According to a second aspect of the present invention, an image forming system reflecting one aspect of the present invention comprises an image former which forms an image on paper; and the image test apparatus which performs a test on the paper on which the image is formed by the image former.

According to a third aspect of the present invention, a recording medium reflecting one aspect of the present invention is a non-transitory computer readable recording medium storing a program causing a computer of an image test apparatus, which includes an image reader which reads paper on which an image is formed from an image formed surface side to acquire test image data including an entire region of the paper, and which detects a defect in the test image data by comparing the test image data acquired by the image reader with correct image data, to perform after aligning positions of the test image data and the correct image data by aligning positions of images to each other, detecting a defect in the test image data in a region where the test image data overlaps with the correct image data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 5A is a diagram for explaining alignment of positions of images in the test processing.

FIG. 5B is a diagram for explaining alignment of positions of images in the test processing.

FIG. 5C is a diagram for explaining alignment of positions of images in the test processing.

FIG. 5D is a diagram for explaining alignment of positions of images in the test processing.

FIG. 8 is a flowchart illustrating a modified example.

DETAILED DESCRIPTION OF EMBODIMENTS

Hereinafter, one or more embodiment of the present invention will be described with reference to the drawings. However, the scope of the invention is not limited to the disclosed embodiments.

[Configuration of Image Forming System]

First, a configuration of an image forming system 1 according to the present embodiment will be described.

Figure 1:
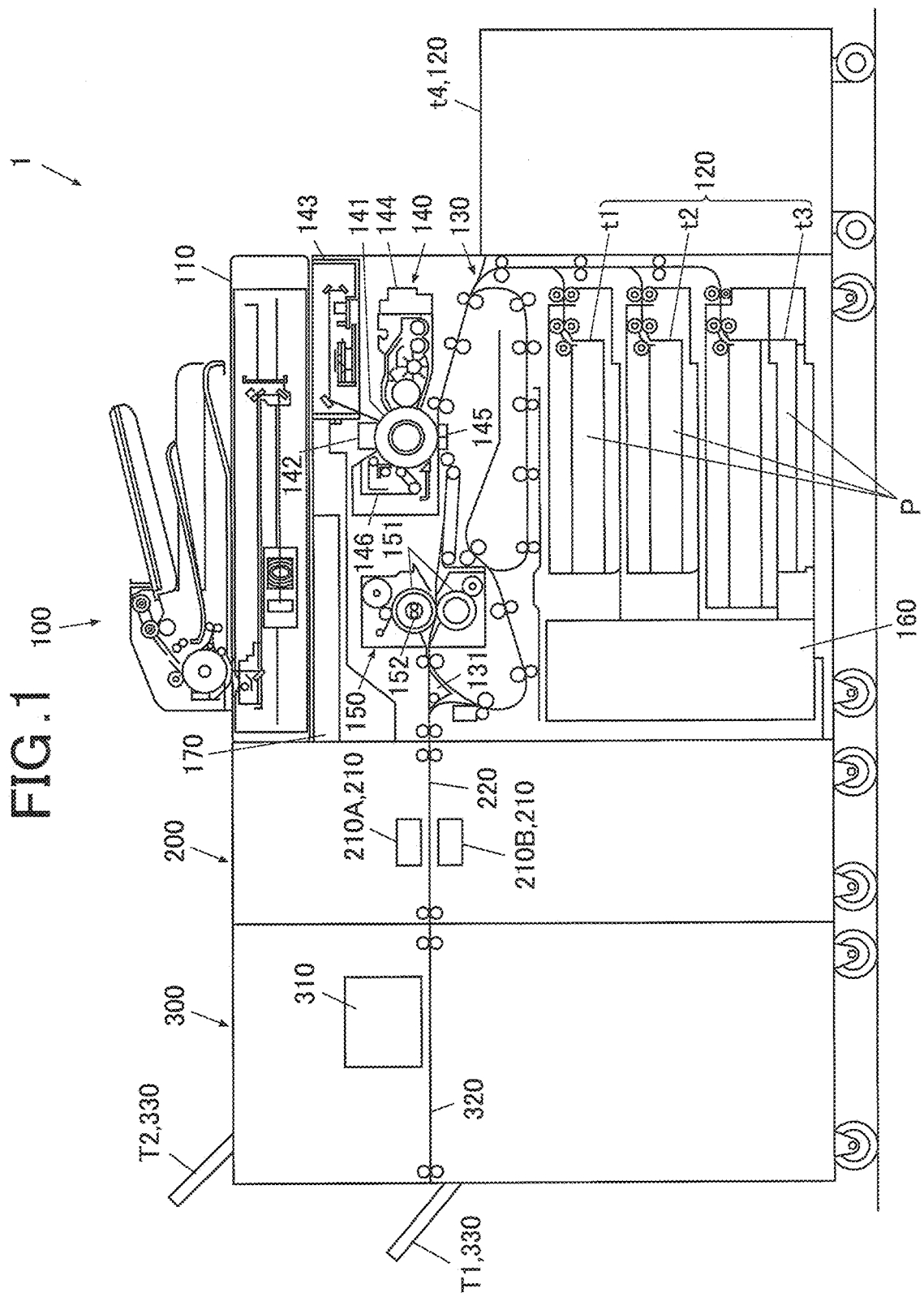
FIG. 1 is a schematic pattern diagram illustrating an entire configuration of an image forming system.
Figure 2:
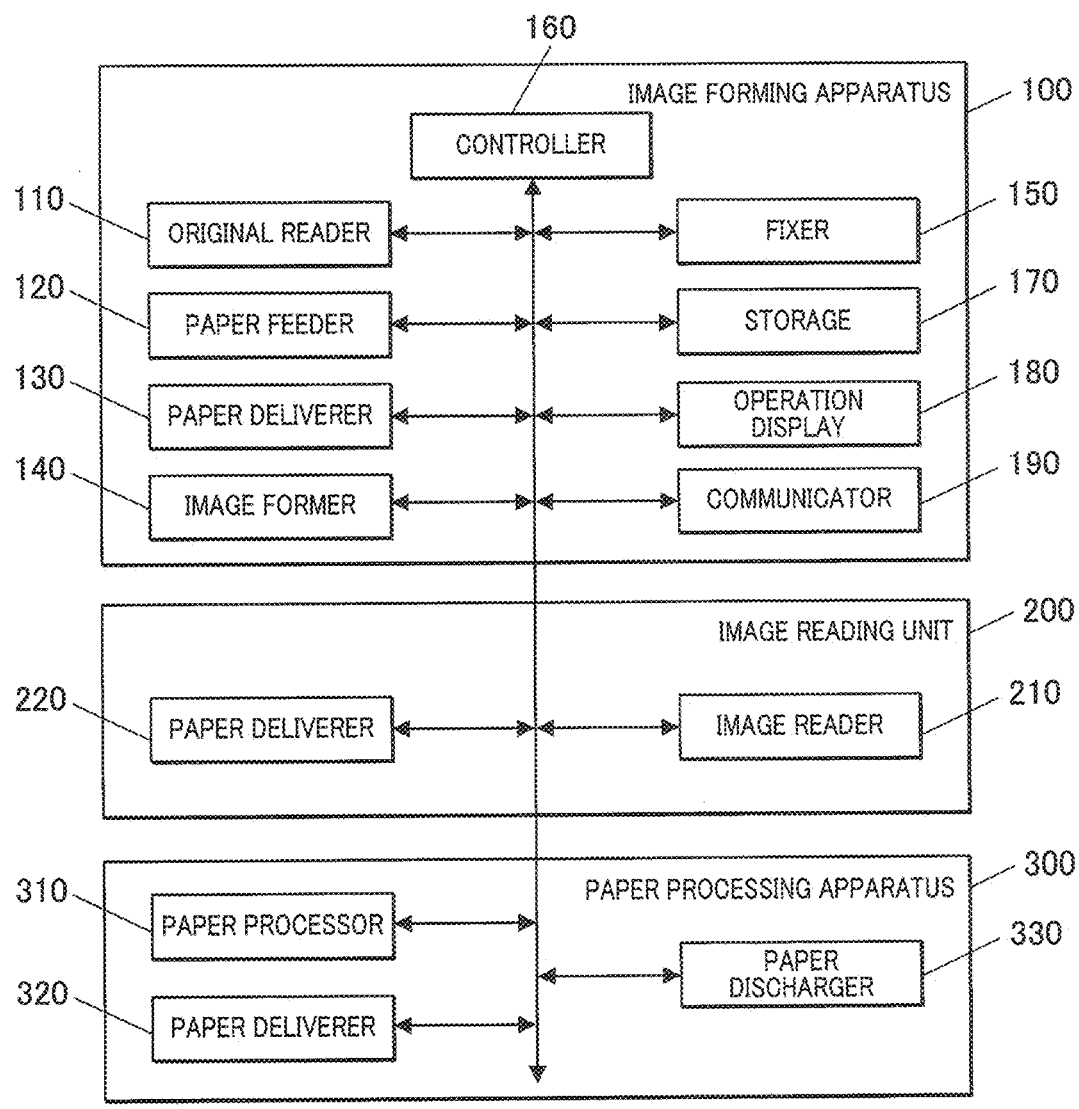
FIG. 2 is a block diagram illustrating a functional configuration of the image forming system.

FIG. 1 is a schematic pattern diagram illustrating an entire configuration of the image forming system 1. FIG. 2 is a block diagram illustrating a functional configuration of the image forming system 1.

As illustrated in FIG. 1 and FIG. 2, the image forming system 1 includes an image forming apparatus 100, an image reading unit 200 and a paper processing apparatus 300.

The image forming apparatus 100 is an apparatus which forms an image on paper P. The image reading unit 200 is a unit which reads an image formed surface of the paper P to acquire read data. The paper processing apparatus 300 is an apparatus which performs predetermined paper processing on the paper P as necessary.

The paper P on which an image is formed by the image forming apparatus 100 is delivered to the paper processing apparatus 300 via the image reading unit 200, is subjected to predetermined paper processing by the paper processing apparatus 300 as necessary and is discharged.

Note that, while, in the present embodiment, the image forming system 1 includes the paper processing apparatus 300, the paper processing apparatus 300 does not necessarily have to be connected.

Details of the image forming apparatus 100, the image reading unit 200 and the paper processing apparatus 300 will be described below in this order.

<Image Forming Apparatus>

As illustrated in FIG. 1 and FIG. 2, the image forming apparatus 100 includes, for example, an original reader 110, a paper feeder 120, a paper deliverer 130, an image former 140, a fixer 150, a controller 160, a storage 170, an operation display 180, a communicator 190, and the like.

The original reader 110 optically reads an original to generate image data.

Specifically, the original reader 110 delivers an original placed on an original tray using a delivery mechanism, optically scans the original, reads an image on the original by forming an image of reflected light from the original on a light receiving surface of a CCD (Charge Coupled Device) sensor, and generates image data.

The paper feeder 120 stores paper P before an image is formed by the image forming apparatus 100, and, when image forming processing is started, sends out the stored paper P to the paper deliverer 130.

As illustrated in FIG. 1, the paper feeder 120 includes a plurality of paper feed trays t1 to t3 provided at a lower part of a chassis of the image forming apparatus 100, and a large capacity paper feed tray t4 provided separately from the chassis of the image forming apparatus 100, and can store paper P of different sizes. Note that at least two of the plurality of paper feed trays t1 to t3 and the large-capacity paper feed tray t4 may store paper P of the same size.

The paper deliverer 130 delivers the paper P sent out from the paper feeder 120 along a paper delivery path inside the image forming apparatus 100 and passes the paper P to the image reading unit 200.

Specifically, the paper deliverer 130 includes, for example, a plurality of rollers provided at intervals along a predetermined paper delivery path determined between and around respective parts of the paper feeder 120, the image former 140, the fixer 150, or the like, a driver which drives the respective rollers and which are not illustrated, or the like. The paper deliverer 130 delivers the paper P sent out from the paper feeder 120 sheet by sheet to the image former 140, delivers the paper P on which an image is formed by the image former 140 to the fixer 150, and delivers the paper P on which the image is fixed by the fixer 150 so as to be discharged from a paper discharge port provided on the image reading unit 200 side.

Further, in the case where printing is performed on both sides, the paper deliverer 130 operates so as to return the paper P to an upstream of the image former 140 from a branch point 131 provided on a delivery path between the fixer 150 and the paper discharge port while front and back of the paper P are inverted.

The image former 140 forms an image on the paper P.

Specifically, the image former 140 includes, for example, a photoreceptor 141 provided so that an outer periphery surface abuts on the paper P to be delivered by the paper deliverer 130, a charger 142 which performs charging processing on the photoreceptor 141, an exposure 143 which performs exposure processing on the charged photoreceptor 141 in accordance with image data, a developer 144 which forms a toner image in accordance with image data to transfer (primary transfer) the toner image on the photoreceptor 141, a transfer 145 which transfers (secondary transfer) the toner image transferred on the photoreceptor 141 on the paper P, a cleaner 146 which removes toner left on the photoreceptor 141 from the photoreceptor 141, or the like. While the image former 140 in the present embodiment performs image forming using a xerographic scheme by the above-described configuration, this is an example, and the scheme is not limited to this. The image former 140 may include a configuration for performing image forming using other image forming methods, such as, for example, ink jet.

Further, while the image former 140 illustrated in FIG. 1 employs a configuration where one developer 144 is provided and image forming using single color is performed, this configuration is an example, and the configuration is not limited to this. The image former 140 may include developers 144 in accordance with respective types of color such as, for example, cyan (C), magenta (M), yellow (Y) and black (K) and may be provided so as to be able to perform color printing using combination of these types of color.

The fixer 150 fixes the image formed by the image former 140 on the paper P.

Specifically, the fixer 150 includes, for example, a pair of fixing rollers 151, 151 provided so that outer periphery surfaces abut on each other across the delivery path of the paper P, a heater 152 which heats the roller on a surface side (for example, an upper side in FIG. 1) of the paper P on which the image is formed by the image former 140, out of the pair of rollers 151, 151, or the like. The fixer 150 fixes the toner image transferred on the paper P, on the paper P by holding the paper P between the pair of fixing rollers 151, 151 which are rotationally driven and delivering the paper P on which the image is formed while heating the paper P with one roller which is heated by the heater 152.

The controller 160 comprehensively controls each apparatus or each part of each apparatus of the image forming system 1 in accordance with an instruction input from the operation display 180 or the communicator 190. The controller 160 includes a CPU (Central Processing Unit), a RAM (Random Access Memory), or the like, and the CPU reads out a program stored in the storage 170, expands the program in a work area within the RAM and executes various kinds of processing in coordination with the program.

For example, the controller 160 performs image forming processing, or the like, on the paper P by the image forming apparatus 100 on the basis of the image data acquired via the original reader 110.

Further, the controller 160 causes the image reading unit 200 to read the image formed surface of the paper P on which the image is formed to acquire read data (test image data), and performs test processing (which will be described in detail later) for testing a state of the image by comparing the read data with predetermined correct image data.

The storage 170 is configured with a non-volatile semiconductor memory, an HDD (Hard Disk Drive), or the like, and stores a program to be executed by the controller 160, and data necessary for execution of the program. For example, the storage 170 stores correct image data to be used for test processing.

Further, the storage 170 stores various kinds of setting conditions regarding image forming processing at the image forming apparatus 100, various kinds of setting conditions regarding paper processing at the paper processing apparatus 300, or the like.

Note that, while, in the present embodiment, the controller 160 of the image forming apparatus 100 controls operation of respective apparatuses (units) constituting the image forming system 1, such a configuration is an example, and the configuration is not limited to this. For example, a control apparatus for controlling operation of the image forming system 1 may be separately provided or controllers may be individually provided at the respective apparatuses (units).

The operation display 180 includes a touch panel which displays various kinds of information relating to operation of the image forming system 1 and detects various kinds of input operation to be performed by a user in accordance with display content, a plurality of switches for various kinds of input operation to be performed by the user, or the like. Note that the controller 160 performs processing relating to control of the display content at the touch panel of the operation display 180. Further, the controller 160 controls operation of the image forming system 1 on the basis of various kinds of input operation content performed by the user via the operation display 180.

The communicator 190 includes a network interface card (NIC), a configuration corresponding to this, or the like, and performs communication between the image forming system 1 and other computers. In the case where an image forming job including image data is input via the communicator 190, the controller 160 performs image forming processing, or the like, on the basis of the image forming job.

<Image Reading Unit>

The image reading unit 200 reads the paper P introduced from the image forming apparatus 100 and outputs the read data to the controller 160.

The image reading unit 200 includes, for example, an image reader 210 and a paper deliverer 220.

The image reader 210 includes a first scanner 210A and a second scanner 210B, and the first scanner 210A and the second scanner 210B are disposed at positions at which the scanners can respectively read a front side and a back side of the paper P to be delivered.

The first scanner 210A and the second scanner 210B are, for example, orthogonal to a paper delivery direction, and is configured with a line sensor in which CCDs (Charge Coupled Devices) are arranged in a line shape in a direction (paper width direction) parallel to a paper surface.

The first scanner 210A and the second scanner 210B read the paper P on which the image is formed in a size larger than the size of the paper P by a predetermined amount and outputs the obtained read data to the controller 160.

The paper deliverer 220 delivers the paper P sent out from the image forming apparatus 100 along the paper delivery path inside the image reading unit 200 and passes the paper P to the paper processing apparatus 300.

Note that the image test apparatus is configured with the above-described image reader 210 and the above-described controller 160.

<Paper Processing Apparatus>

The paper processing apparatus 300 executes paper processing as necessary on the paper P introduced from the image reading unit 200 and discharges the paper P to outside.

The paper processing apparatus 300 includes, for example, a paper processor 310, a paper deliverer 320, a paper discharger 330, or the like.

The paper processor 310 includes a configuration for performing one or a plurality of types of paper processing such as, for example, perforation and folding, side stitch, saddle stitch and cutting, and executes paper processing on the paper P introduced from the image reading unit 200 as necessary.

The paper deliverer 320 delivers the paper P sent out from the image reading unit 200 along a paper delivery path inside the paper processing apparatus 300 and sends out the paper P to paper discharge trays T1 and T2.

As illustrated in FIG. 1, the paper discharger 330 includes the paper discharge tray T1 provided at a side portion of the paper processing apparatus 300 and the paper discharge tray T2 provided at an upper portion of the paper processing apparatus 300, and causes the paper P delivered through the paper deliverer 320 to be discharged while switching a tray to which the paper P is to be discharged between the paper discharge tray T1 and the paper discharge tray T2.

[Operation of Image Test System]

Operation of the image forming system 1 in the present embodiment will be described next.

In the image forming system 1, test processing is executed in which the paper P on which the image is formed by the image forming apparatus 100 is read by the image reading unit 200 to acquire read data (test image data), and a state of the image is tested by comparing this test image data with predetermined correct image data.

Further, prior to this processing, in the image forming system 1, correct image generation processing of generating the correct image data is executed.

The correct image generation processing and the test processing will be described in detail below in this order.

<Correct Image Generation Processing>

Figure 3:
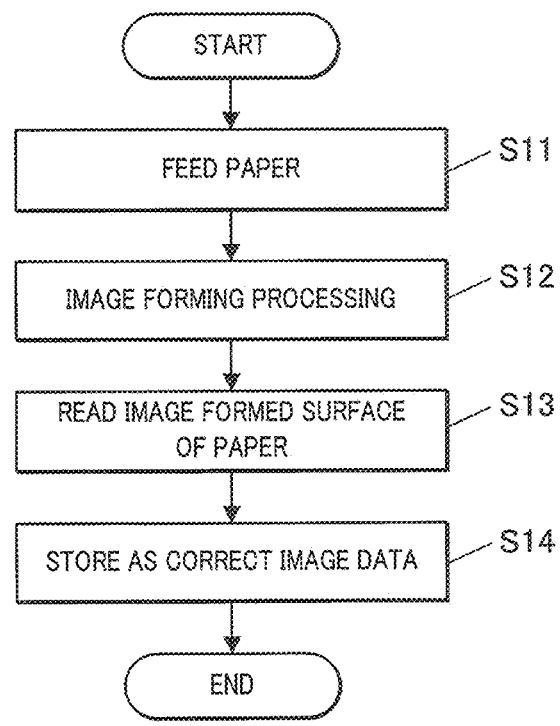
FIG. 3 is a flowchart illustrating correct image generation processing.

FIG. 3 is a flowchart illustrating the correct image generation processing.

Note that processing in FIG. 3 is executed by the controller 160 in coordination with the program stored in the storage 170.

First, the controller 160 causes the paper feeder 120 to feed paper P of a predetermined size (step S11), and causes the image former 140 and the fixer 150 to form a predetermined image on the paper P (step S12).

Then, the controller 160 causes the image reader 210 to scan an image formed surface of this paper P in a range larger than the paper P by a predetermined amount both in a longitudinal direction and in a lateral direction to acquire read data including an entire region to four sides of the paper (step S13), stores this read data in the storage 170 as the correct image data (step S14), and finishes the present processing.

The "range larger by a predetermined amount" is, for example, a range having a size obtained by respectively adding approximately 10 mm to the four sides of the paper P. By this means, the correct image data becomes an image which includes the entire region to the four sides of the paper and which is slightly larger than the paper P.

<Test Processing>

Figure 4:
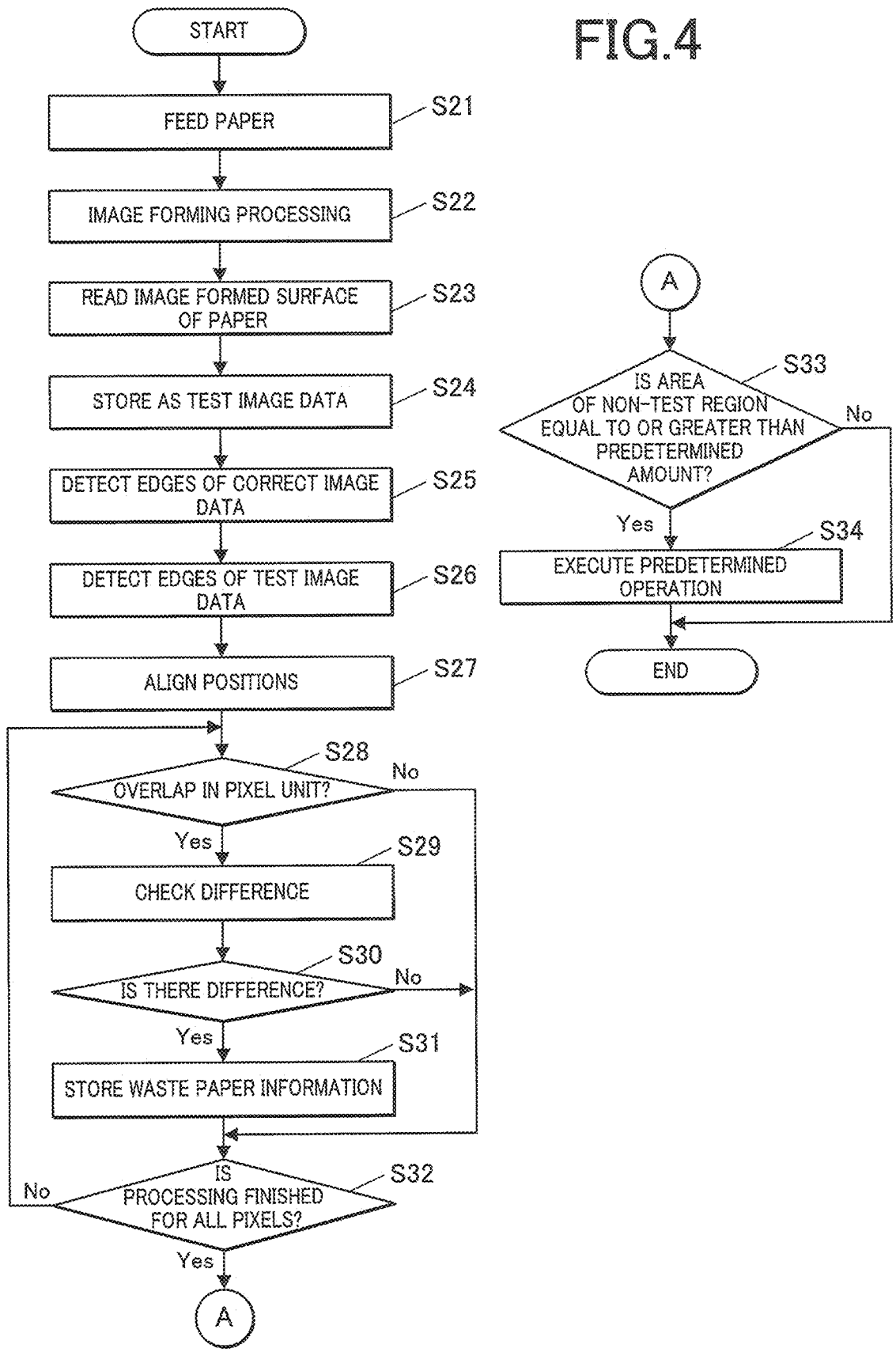
FIG. 4 is a flowchart illustrating test processing.

FIG. 4 is a flowchart illustrating the test processing.

Note that processing in FIG. 4 is executed by the controller 160 in coordination with the program stored in the storage 170.

First, the controller 160 causes the paper feeder 120 to feed paper P of a predetermined size (step S21) and causes the image former 140 and the fixer 150 to form a predetermined image on the paper P (step S22). Here the "predetermined image" is an image which is the same as the image formed in the correct image.

Then, the controller 160 causes the image reader 210 to scan an image formed surface of this paper P in a range larger than the paper P by a predetermined amount both in a longitudinal direction and in a lateral direction to acquire read data including an entire region to four sides of the paper (step S23) and stores this read data in the storage 170 as test image data (step S24).

The "range lager by a predetermined amount" is, for example, a range having a size obtained by respectively adding approximately 10 mm to the four sides of the paper P. By this means, the test image data becomes an image which includes the entire region to the four sides of the paper and which is slightly larger than the paper P.

Then, the controller 160 detects edges at four sides of the paper P for the correct image data (step S25), and, then, also detects edges at four sides of the paper P for the test image data (step S26).

Note that detection of the edges of the image data may be performed using any publicly known method.

By this means, the correct image data of a paper size and the test image data of a paper size are acquired.

Then, the controller 160 aligns positions of two pieces of data on the basis of regions where images are formed of the correct image data and the test image data using the correct image data and the test image data acquired in step S25 and step S26 (step S27).

That is, the controller 160 aligns the positions by aligning positions of images of the correct image data and the test image data in which the same image is formed. By this alignment of the positions, a region where the two pieces of data overlap with each other becomes a test region.

FIG. 5A to FIG. 5D illustrate conceptual diagrams of the region (the test region) where the two pieces of data overlap with each other.

FIG. 5A illustrates an example where the size of the paper P of the correct image data is the same as the size of the paper P of the test image data, and the test image data is skewed. In the example in FIG. 5A, while the test image data is skewed, the positions of the two pieces of data are aligned so that the regions where the images are formed (portion of "A") overlap with each other, and, as a result, edges of the correct image data and the test image data completely overlap with each other, and the whole of the test image data becomes the test region (hatched area).

FIG. 5B illustrates an example where the size of the paper P of the test image data is smaller than the size of the paper P of the correct image data. In the example in FIG. 5B, because the size of the paper P of the test image data is smaller than the size of the paper P of the correct image data, if the positions of the two pieces of data are aligned so that the regions where the images are formed (portion of "A") overlap with each other, the whole of the test image data overlaps with the correct image data, in which case, the whole of the test image data becomes the test region (hatched area).

FIG. 5C illustrates an example where the size of the paper P of the test image data is larger than the size of the paper P of the correct image data. In the example in FIG. 5C, because the size of the paper P of the test image data is larger than the size of the paper P of the correct image data, if the positions of the two pieces of data are aligned so that the regions where the images are formed (portion of "A") overlap with each other, only part of the test image data overlaps with the correct image data, and the portion where the data overlaps with each other becomes the test region (hatched area).

FIG. 5D illustrates an example where the size of the paper P of the correct image data is the same as the size of the paper P of the test image data, and the regions where the images are formed (portion of "A") are displaced. In the example illustrated in FIG. 5D, because the regions where the images are formed are displaced, if the positions of the two pieces of data are aligned so that the regions where the images are formed overlap with each other, only part of the test image data overlaps with the correct image data, and the portion where the data overlaps with each other becomes the test region (hatched area).

Returning to FIG. 4, the controller 160 judges whether or not pixels of the two pieces of data overlap with each other when certain pixels are observed by focusing attention on the overlapped data in a pixel unit (that is, whether or not pixels on which attention is focused enter the test region (the hatched area in FIG. 5)) (step S28).

Note that in a pixel unit described here may be for each pixel or may be in unit of a plurality of pixels.

In the case where it is judged that the pixels do not overlap with each other (do not enter the test region) (step S28: No), processing of the controller 160 transitions to step S32 which will be described later.

Meanwhile, in the case where it is judged that the pixels overlap with each other (enter the test region) (step S28: Yes), the controller 160 checks a difference between the two pieces of data concerning predetermined items such as, for example, concentration (step S29).

Then, it is judged whether or not there is a difference as a result of check of the difference (step S30), and, in the case where it is judged that there is no difference (step S30: No), the processing transitions to step S32 which will be described later.

Meanwhile, in the case where it is judged that there is a difference (step S30: Yes), the controller 160 stores waste paper information in the storage 170 (step S31).

Here, the "waste paper information" is information indicating a degree of a difference between information (XY coordinate) indicating a position (pixel) in the paper P and the position (pixel) (such as, for example, a degree of a difference in concentration compared to the correct image data).

Then, the controller 160 judges whether or not processing is finished for all the pixels (step S32), and, in the case where the processing is not finished for all the pixels (step S32: No), the processing returns to the above-described step S28, and the processing in step S28 and subsequent steps is repeated.

Meanwhile, in the case where the processing is finished for all the pixels (step S32: Yes), the controller 160 judges whether or not an area of a region where the correct image data does not overlap with the test image data (non-test region) is equal to or greater than a predetermined amount (step S33).

The area of the non-test region can be calculated by adding pixels for which it is judged that the data does not overlap with each other in the above-described step S28.

Then, in the case where it is judged that the area of the non-test region is equal to or greater than the predetermined amount (step S33: Yes), the controller 160 executes predetermined operation (step S34).

The predetermined operation is, for example, notification to the user via the operation display 180 (such as notification of giving a warning as to an error in setting of a paper size), termination of a job, operation of switching a tray to which the paper P is to be discharged so as to discharge the paper P subjected to this test processing to a paper discharge tray (for example, T2) different from a regular paper discharge tray (for example, T1), or the like.

Meanwhile, in the case where it is judged that the area of the non-test region is not equal to or greater than the predetermined amount (step S33: No), the controller 160 finishes the present processing.

While a test corresponding to one page is finished as described above, the test processing is executed on all pages in a similar manner.

[Effects in the Present Embodiment]

As described above, according to the present embodiment, the image forming apparatus includes the image reader 210 which reads paper P on which an image is formed from an image formed surface side to acquire test image data including an entire region of the paper P, and the controller 160 which detects a defect in the test image data by comparing the test image data acquired by the image reader 210 with correct image data, and the controller 160 detects a defect in the test image data in a region where the test image data overlaps with the correct image data after aligning positions of the test image data and the correct image data by aligning positions of images to each other.

Therefore, because a region where the correct image data overlaps with the test image data becomes a test region, it is possible to perform a test without receiving influence of variation in a size of the paper P. That is, it is possible to avoid erroneous judgement (erroneous determination) as NG by picking up a difference due to a difference in the paper size.

Therefore, it is possible to avoid erroneous determination of a test due to variation in the paper size, so that it is possible to prevent reduction in productivity.

Further, according to the present embodiment, the image reader 210 reads the paper P on which the image is formed in a size larger than the size of the paper P by a predetermined amount to acquire the test image data and the correct image data of the size of the paper P.

Therefore, it is possible to detect edges by reading the paper P on which the image is formed in a size larger than the size of the paper P by a predetermined amount, so that it is possible to generate the test image data and the correct image data of the size of the paper P.

Further, according to the present embodiment, after the positions of the test image data and the correct image data are aligned by aligning positions of images to each other, in the case where there is a region where the test image data does not overlap with the correct image data, and an area of the region where the two pieces of data do not overlap with each other is equal to or greater than a predetermined amount, the controller 160 performs predetermined operation for notifying the user.

Therefore, in the case where an area of the non-test region where the two pieces of data do not overlap with each other is equal to or greater than the predetermined amount, the user can immediately recognize this and can promptly deal with this.

Further, according to the present embodiment, the predetermined operation includes at least one of display of a predetermined message by the operation display 180, termination of a job which is being executed, and switching of a tray to which the paper P for which the test image data is acquired is to be discharged.

Therefore, in the case where the area of the non-test region where the two pieces of data do not overlap with each other is equal to or greater than the predetermined amount, the user can recognize this through such predetermined operation.

Note that embodiments to which the present invention can be applied are not limited to the above-described embodiment and modified examples, and can be changed as appropriate within a range not deviating from the gist of the present invention.

For example, in the above-described test processing in FIG. 4, processing indicated in the following modified examples 1 to 3 may be executed.

<Test Processing: Modified Example 1>

Figure 6:
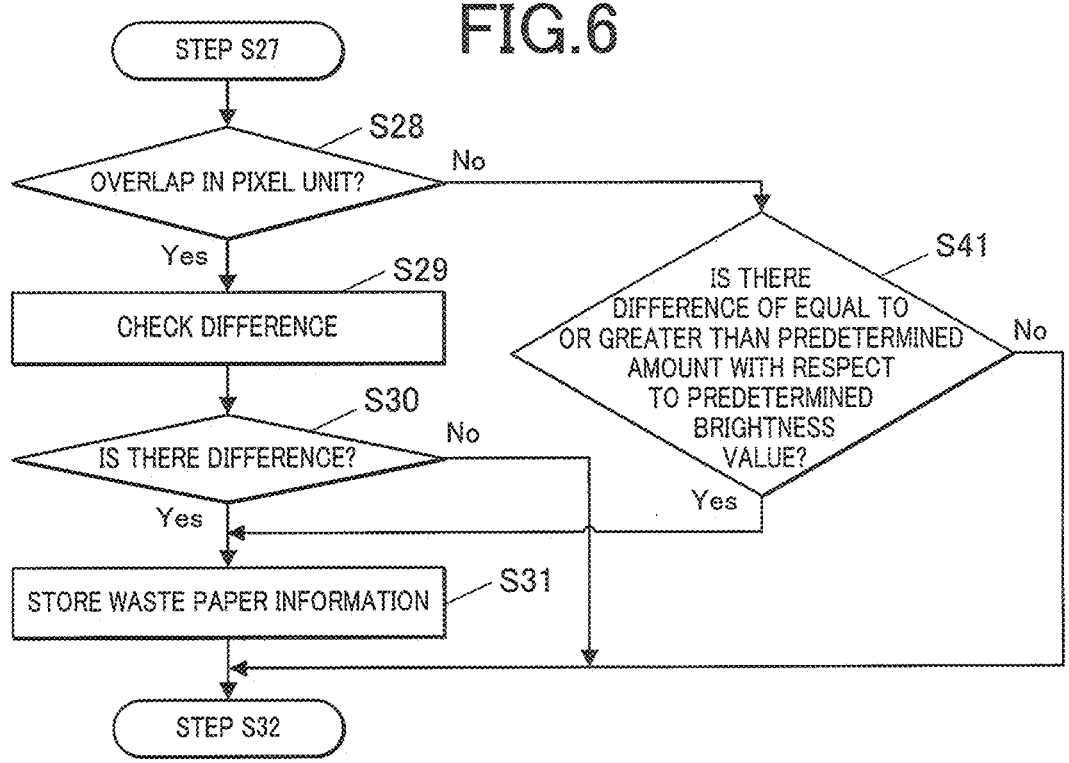
FIG. 6 is a flowchart illustrating a modified example.

FIG. 6 is a flowchart illustrating test processing in modified example 1. Note that, in FIG. 6, the same reference numerals will be assigned to processing which is the same as the processing in FIG. 4, and description thereof will be omitted.

As illustrated in FIG. 6, in test processing in modified example 1, in the case where it is judged in step S28 that pixels do not overlap with each other (do not enter the test region) (step S28: No), the controller 160 performs a test while applying other test methods different from the test method for the test region.

As the other test methods, for example, the controller 160 judges whether or not there is a difference of equal to or greater than a predetermined amount, with respect to a predetermined brightness value (step S41). That is, in the case where there is a difference of equal to or greater than a predetermined amount for a region which is considered as "white background" (predetermined brightness value), it is judged that there is an abnormality such as smear.

Then, in the case where there is a difference of equal to or greater than the predetermined amount (step S41: Yes), the processing transitions to the above-described step S31, and the controller 160 stores waste paper information in the storage 170.

Meanwhile, in the case where there is no difference of equal to or greater than the predetermined amount (step S41: No), the processing of the controller 160 transitions to the above-described step S32.

In a case of modified example 1 described above, after the positions of the test image data and the correct image data are aligned by aligning positions of images to each other, in the case where there is a region where the test image data does not overlap with the correct image data, the controller 160 detects a defect in the region where the two pieces of data do not overlap with each other using a method different from the method for a region where the two pieces of data overlap with each other.

Specifically, the controller 160 detects as a defect a case where there is a difference in these pieces of data in the region where the test image data overlaps with the correct image data, and detects as a defect a case where there is a difference of equal to or greater than the predetermined amount with respect to the predetermined brightness value in the region where the test image data does not overlap with the correct image data.

Therefore, because a test can be performed also in a region where the two pieces of data do not overlap with each other as well as in a region where the two pieces of data overlap with each other, test accuracy improves.

<Test Processing: Modified Example 2>

Figure 7:
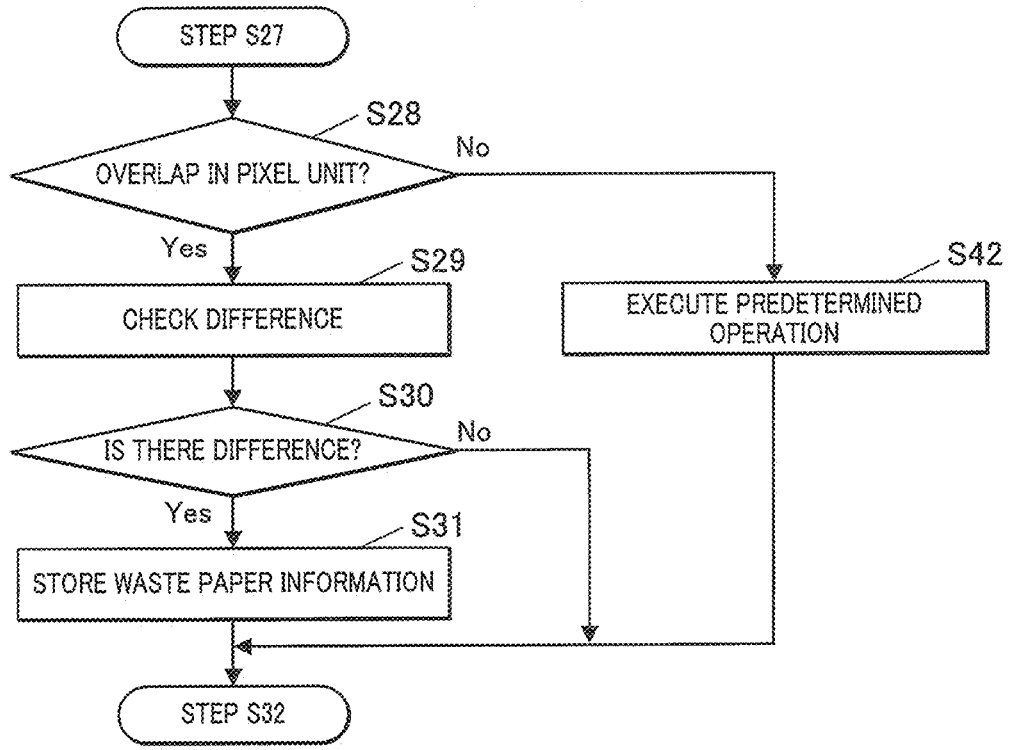
FIG. 7 is a flowchart illustrating a modified example.

FIG. 7 is a flowchart illustrating test processing in modified example 2. Note that, in FIG. 7, the same reference numerals will be assigned to processing which is the same as the processing in FIG. 4, and description thereof will be omitted.

As illustrated in FIG. 7, in the test processing in modified example 2, in the case where it is judged in step S28 that pixels do not overlap with each other (do not enter the test region) (step S28: No), the controller 160 performs predetermined operation for notifying the user (step S42).

The predetermined operation is, for example, notification to the user via the operation display 180 (such as notification of giving a warning as to an error in setting of a paper size), termination of a job, operation of switching a tray to which the paper P subjected to this test processing is to be discharged to a paper discharge tray (for example, T2) different from a regular paper discharge tray (for example, T1), or the like.

Thereafter, the processing of the controller 160 transitions to the above-described step S32.

In a case of modified example 2 described above, in the case where there is a region where the two pieces of data do not overlap with each other, the user can immediately recognize this and can promptly deal with this.

<Test Processing: Modified Example 3>

FIG. 8 is a flowchart illustrating test processing in modified example 3. Note that, in FIG. 8, the same reference numerals will be assigned to processing which is the same as the processing in FIG. 4, and description thereof will be omitted.

As illustrated in FIG. 8, in the test processing in modified example 3, in the case where it is judged in step S28 that pixels do not overlap with each other (do not enter the test region) (step S28: No), the controller 160 judges whether or not pixels on which attention is focused are included in the test image data (step S43).

Then, in the case where the pixels are included in the test image data (step S43: Yes), the controller 160 executes processing which is the same as the processing in step S41 in FIG. 6 and judges whether or not there is a difference of equal to or greater than the predetermined amount with respect to the predetermined brightness value (step S44).

Then, in the case where there is a difference of equal to or greater than the predetermined amount (step S44: Yes), the processing transitions to the above-described step S31, and the controller 160 stores waste paper information in the storage 170.

Meanwhile, in the case where the pixels are not included in the test image data (step S43: No) or in the case where there is no difference of equal to or greater than the predetermined amount (step S44: No), the processing of the controller 160 transitions to the above-described step S32.

Note that, at this time, it is also possible to perform processing which is the same as the processing in step S42 in FIG. 7 and perform predetermined operation for notifying the user.

In a case of modified example 3 described above, the controller 160 detects a defect in the region where the two pieces of data do not overlap with each other using a method different from the method for the region where the two pieces of data overlap with each other only in the case where the region where the two pieces of data do not overlap with each other is included in the test image data (in the case where the pixels on which attention is focused are included in the test image data).

Therefore, it is possible to omit an unnecessary test, so that it is possible to make the test processing more efficient.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2018-118414, filed on 22Jun. 2018, incorporated herein by reference in its entirety.

What is claimed is:

1. An image test apparatus comprising:
    an image reader which reads paper on which an image is formed from an image formed surface side to acquire test image data including an entire region of the paper; and
    a hardware processor which detects a defect in the test image data by comparing the test image data acquired by the image reader with correct image data,
    wherein the hardware processor detects a defect in the test image data in a region where the test image data overlaps with the correct image data after aligning positions of the test image data and the correct image data by aligning positions of images to each other;
    wherein, after aligning the positions of the test image data and the correct image data by aligning the positions of the images to each other, in a case where there is a region where the test image data does not overlap with the correct image data, the hardware processor detects a defect in a region where the test image data does not overlap with the correct image data using a method different from a method for a region where the test image data overlaps with the correct image data.

2. The image test apparatus according to claim 1,
    wherein the image reader reads paper on which an image is formed in a size larger than a size of the paper by a predetermined amount to acquire the test image data of the size of the paper.

3. The image test apparatus according to claim 1,
    wherein the image reader reads paper on which an image is formed in a size larger than a size of the paper by a predetermined amount to acquire the correct image data of the size of the paper.

4. The image test apparatus according to claim 1,
    wherein the hardware processor detects as a defect a case where there is a difference between the test image data and the correct image data in a region where the test image data overlaps with the correct image data, and
    the hardware processor detects as a defect a case where there is a difference of equal to or greater than a predetermined amount with respect to a predetermined brightness value in a region where the test image data does not overlap with the correct image data.

5. The image test apparatus according to claim 1,
    wherein the hardware processor detects a defect in the region where the test image data does not overlap with the correct image data using a method different from a method for the region where the test image data overlaps with the correct image data only in a case where the region where the test image data does not overlap with the correct image data is included in the test image data.

6. An image forming system comprising:

an image former which forms an image on paper; and the image test apparatus according to claim 1, which performs a test on the paper on which the image is formed by the image former.

7. An image test apparatus comprising:

an image reader which reads paper on which an image is formed from an image formed surface side to acquire test image data including an entire region of the paper; and a hardware processor which detects a defect in the test image data by comparing the test image data acquired by the image reader with correct image data, wherein the hardware processor detects a defect in the test image data in a region where the test image data overlaps with the correct image data after aligning positions of the test image data and the correct image data by aligning positions of images to each other;

wherein, after aligning the positions of the test image data and the correct image data by aligning the positions of the images to each other, in a case where there is a region where the test image data does not overlap with the correct image data, the hardware processor performs predetermined operation for notifying a user; and wherein the hardware processor performs the predetermined operation only in a case where an area of the region where the test image data does not overlap with the correct image data is equal to or greater than a predetermined amount.

8. The image test apparatus according to claim 7, wherein the predetermined operation includes at least one of display of a predetermined message by a display, termination of a job which is being executed, and switching of a tray to which paper for which the test image data is acquired is to be discharged.

9. An image forming system comprising:

the image test apparatus according to claim 7.

10. A non-transitory computer readable recording medium storing a program causing a computer of an image test apparatus which includes an image reader which reads paper on which an image is formed from an image formed surface side to acquire test image data including an entire region of the paper, and which detects a defect in the test image data by comparing the test image data acquired by the image reader with correct image data, to perform after aligning positions of the test image data and the correct image data by aligning positions of images to each other, detecting a defect in the test image data in a region where the test image data overlaps with the correct image data;

wherein, after aligning the positions of the test image data and the correct image data by aligning the positions of the images to each other, in a case where there is a region where the test image data does not overlap with the correct image data, detecting a defect in a region where the test image data does not overlap with the correct image data using a method different from a method for a region where the test image data overlaps with the correct image data.

11. A non-transitory computer readable recording medium storing a program causing a computer of an image test apparatus which includes an image reader which reads paper on which an image is formed from an image formed surface side to acquire test image data including an entire region of the paper, and which detects a defect in the test image data by comparing the test image data acquired by the image reader with correct image data, to perform detecting a defect in the test image data in a region where the test image data overlaps with the correct image data after aligning positions of the test image data and the correct image data by aligning positions of images to each other, and after aligning the positions of the test image data and the correct image data by aligning the positions of the images to each other, in a case where there is a region where the test image data does not overlap with the correct image data, performing predetermined operation for notifying a user, wherein the hardware processor performs the predetermined operation only in a case where an area of the region where the test image data does not overlap with the correct image data is equal to or greater than a predetermined amount.

* * * * *